United States Patent [19]

Kurose et al.

[11] Patent Number: 4,689,747

[45] Date of Patent: Aug. 25, 1987

[54] VEHICLE NAVIGATIONAL APPARATUS FOR DISPLAYING A ROAD MAP

[75] Inventors: Yoshio Kurose, Okazaki; Tokitaka Tomochika, Funabashi, both of Japan

[73] Assignees: Nippondenso co., ltd., Kariya; Shobunsha co., ltd., Tokyo, both of Japan

[21] Appl. No.: 746,790

[22] Filed: Jun. 20, 1985

[30] Foreign Application Priority Data

| Jun. 21, 1984 | [JP] | Japan | 59-128064 |
| Jun. 26, 1984 | [JP] | Japan | 59-131275 |
| Jul. 6, 1984 | [JP] | Japan | 59-141188 |

[51] Int. Cl.$^4$ .............................................. G06F 15/50
[52] U.S. Cl. ..................................... 364/449; 340/995; 73/178 R
[58] Field of Search .............. 364/443, 444, 449, 518, 364/521; 340/988, 995; 343/451; 73/178 R; 342/451

[56] References Cited

U.S. PATENT DOCUMENTS

| 4,470,119 | 4/1984 | Hasebe et al. | 364/449 |
| 4,484,192 | 11/1984 | Seitz et al. | 364/449 |
| 4,502,123 | 2/1985 | Minami | 364/449 |
| 4,504,913 | 11/1985 | Miura et al. | 364/449 |
| 4,511,973 | 3/1985 | Miura et al. | 364/449 |
| 4,513,377 | 5/1985 | Hasebe et al. | 364/449 |
| 4,514,810 | 8/1985 | Ito et al. | 364/449 |
| 4,550,317 | 10/1985 | Moriyama et al. | 340/995 |
| 4,570,227 | 2/1986 | Tachi et al. | 364/444 |
| 4,571,684 | 2/1986 | Takanabe et al. | 364/521 |

*Primary Examiner*—Gary Chin
*Attorney, Agent, or Firm*—Cushman, Darby & Cushman

[57] ABSTRACT

A navigational apparatus for automotive vehicles comprises manually operated command entry keys for specifying a desired page of a road map and specifying one of first and second display scales. Road map data is stored in a memory, the data representing a plurality of nodes along travelling routes that appear on each page of the map and comprising first node data having a first level of significance and second node data having a second level of significance which are addressable in accordance with the specified scale. A data processor reads the stored data from the memory according to the specified page and the specified scale so that the first node data is read when either of the first or second scale is specified and both of the first and second node data are read when the second scale is specified. The processor converts the storage location of the read data to a coordinate location of the memory to cause a display to provide a road map.

25 Claims, 21 Drawing Figures

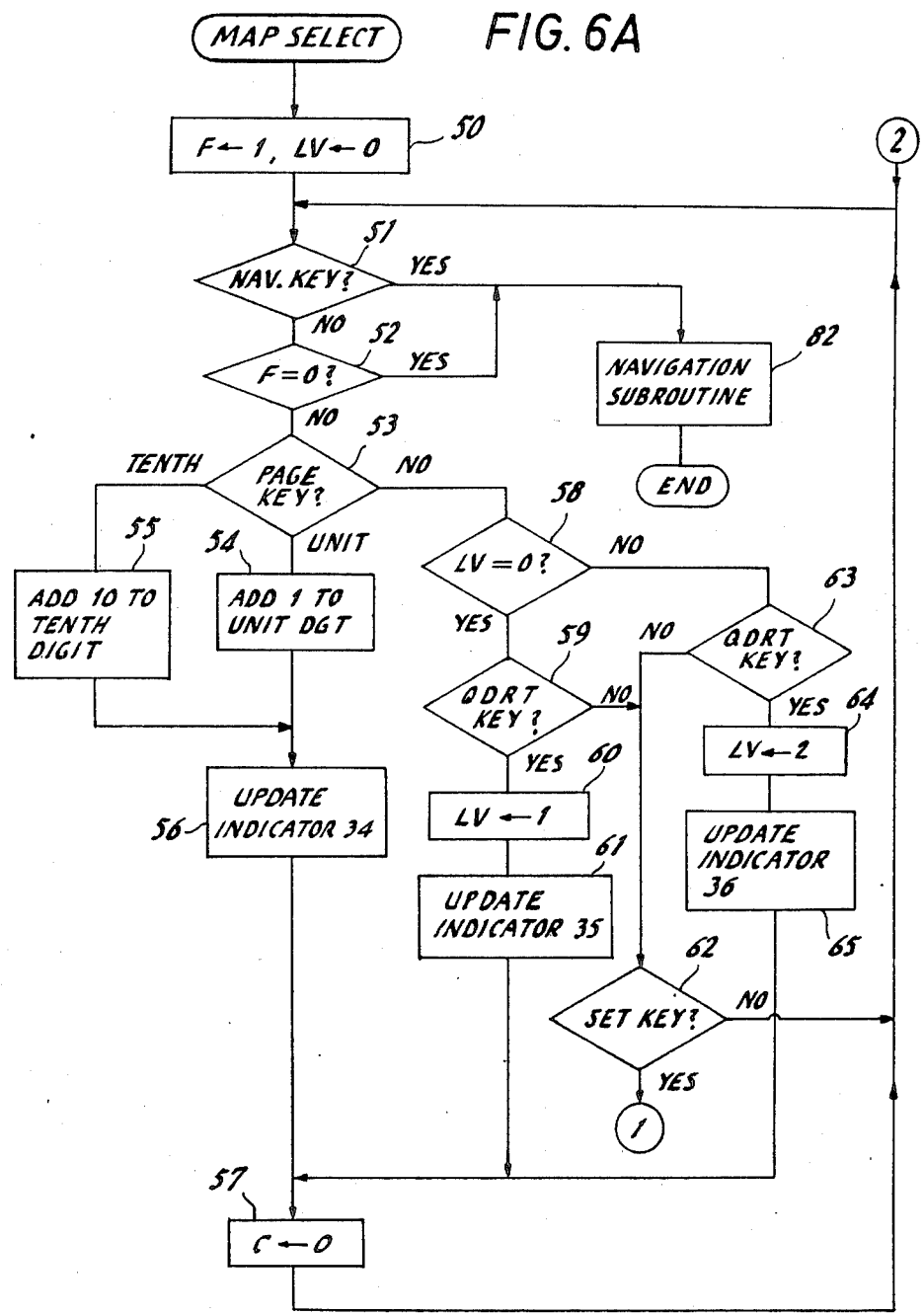

FILE A

| ORDER | | |
|---|---|---|
| 1 | NO. A1 | |
|   | $X_{A1}, Y_{A1}$ | |
|   | NO. A2 | |
|   | ⋮ | |
| 8 | NO. A8 | |
|   | $X_{A8}, Y_{A8}$ | |

FIG. 12B

| ORDER | | |
|---|---|---|
| 1 | NO. B1 | |
|   | $X_{B1}, Y_{B1}$ | FILE B |
|   | ⋮ | |
| i-1 | NO. B$_{i-1}$ | |
|   | $X_{Bi-1}, Y_{Bi-1} (X_{A1}, Y_{A1})$ | |
| i | NO. Bi | |
|   | $X_{Bi}, Y_{Bi} (X_{A2}, Y_{A2})$ | |
| 1 | NO. C1 | |
|   | $X_{C1}, Y_{C1}$ | FILE C |
|   | ⋮ | |
| j-1 | NO. C$_{j-1}$ | |
|   | $X_{Cj-1}, Y_{Cj-1} (X_{A3}, Y_{A3})$ | |
| j | NO. Cj | |
|   | $X_{Cj}, Y_{Cj} (X_{A4}, Y_{A4})$ | |
| 1 | NO. D1 | |
|   | $X_{D1}, Y_{D1}$ | FILE D |
|   | ⋮ | |
| k-1 | NO. D$_{k-1}$ | |
|   | $X_{Dk-1}, Y_{Dk-1} (X_{A5}, Y_{A5})$ | |
| k | NO. Dk | |
|   | $X_{Dk}, Y_{Dk} (X_{A6}, Y_{A6})$ | |
| 1 | NO. E1 | |
|   | $X_{E1}, Y_{E1}$ | FILE E |
|   | ⋮ | |
| ℓ-1 | NO. E$_{\ell-1}$ | |
|   | $X_{E\ell-1}, Y_{E\ell-1} (X_{A7}, Y_{A7})$ | |
| ℓ | NO. Eℓ | |
|   | $X_{E\ell}, Y_{E\ell} (X_{A8}, Y_{A8})$ | |

FIG. 12C

FILE F

| $X_F, Y_F$ |
|---|

4,689,747

VEHICLE NAVIGATIONAL APPARATUS FOR DISPLAYING A ROAD MAP

BACKGROUND OF THE INVENTION

The present invention relates generally to a navigational apparatus for displaying a road map on a display.

Navigational apparatus for automotive vehicles are known in the art as a means to display the position of the vehicle in which they are installed, on a road map. In the conventional apparatus, every feature on a road map is represented according to an address in a coordinate system and stored in a recording medium. This would require a large amount of recording medium if a wide variety of road maps are to be displayed. Furthermore, it is advantageous for vehicle drivers to be kept informed of landmarks along the travelling route.

SUMMARY OF THE INVENTION

It is therefore an object of the present invention to reduce the amount of road map information.

The navigational apparatus of the invention comprises manually operated command entry means for specifying a desired page of a road map and specifying one of first and second display scales. Road map data stored in a memory represents a plurality of nodes along travelling routes that appear on each page of the map. The data comprises first node data having a first level of significance and second node data having a second level of significance. The first and second node data are addressable in accordance with different scales specified by the command entry means. A data processor reads a stored data from the memory location indicated by the specified page and the specified scale, so that the first node data is read when either of the first or second scale is specified the second scale data is also read out when the second node is specified, so that both of the first and second node data are read when this second scale is specified. The processor converts the storage location of the read data to a coordinate location of the memory to cause a display to provide a road map.

Another object of the invention is to provide a navigational apparatus in which the command entry means comprises a plurality of digit entry keys associated respectively with equally divided sections of the page, the data processor generates a digit in response to each successive operation of the digit entry keys to generate a multidigit code indicating the location of a desired landmark on the display, the number of the digits indicating the size of the landmark. The processor causes the display to display the landmark with an intensity which is an inverse function of the number of the digit numbers.

BRIEF DESCRIPTION OF THE DRAWINGS

The present invention will be described in further detail with reference to the accompanying drawings, in which:

FIGS. 6A and 6B are a flow diagram describing the steps required to display a road map according to the invention;

FIGS. 10A, 10B and 10C are illustration of another example of the data structure;

FIGS. 12A, 12B and 12C are illustration of node data stored in separate files according to the flow diagram of FIG. 11;

DETAILED DESCRIPTION

Figure 1:
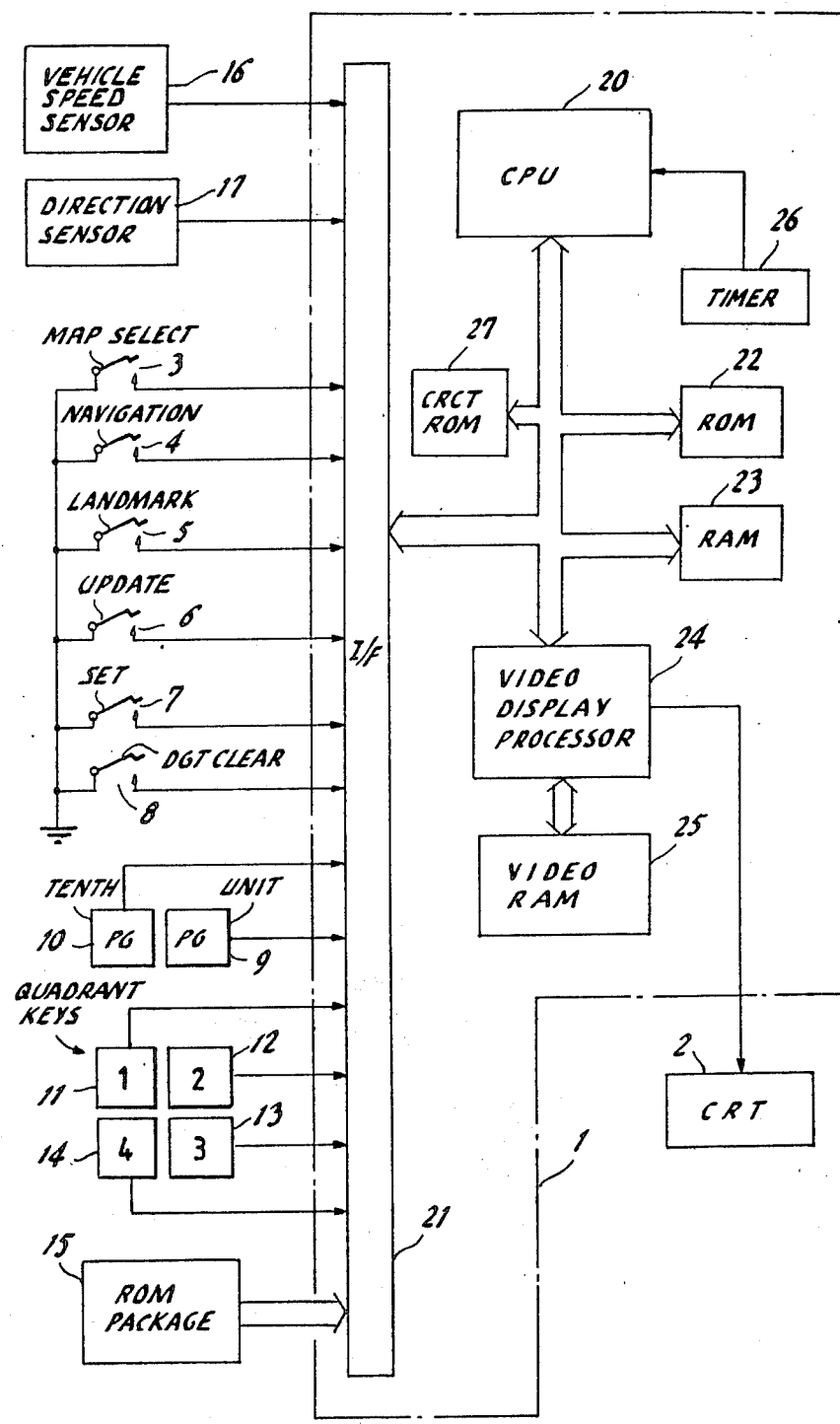
FIG. 1 is a schematic diagram of the navigational apparatus embodying the present invention.

Referring now to FIG. 1, there is shown a vehicle map display apparatus of the presenr invention. The apparatus generally comprises a microcomputer 1, a CRT (cathode-ray tube) display 2, a set of mode select keys 3 to 8, page select keys 9 and 10, a set of rour quadrant keys 11 to 14, and a read-only memory package 15. The apparatus is responsive to signals from a vehicle speed sensor 16 and a direction sensor 17. The microcomputer 1 of a commercially available type includes a video display processor 24 and a video RAM (random access memory) 25 in addition to the microprocessor (CPU) 20 with a timer 26, a program ROM 22 and a work RAM 23. A character ROM 27 is provided to provide numeral indications on CRT display 2. The signals from external sources including the ROM package 15 are applied through an interface 21 to CPU 20.

ROM package 15 is an external memory in which road-map information is stored in locations addressable as a function of road-map page number indicated on a corresponding page of a road-map book. The information stored in each page comprises reference position, node and route data.

Microprocessor 20 is set to a map select mode in response to operation of map select key 3 to allow the vehicle occupant to select a desired road map from the road-map book and enter the page number of the selected map to the microcomputer. Road map information selected from the map is converted to coordinate positions of CRT 2 and used to store video information into video RAM 25 which is scanned in raster format by video processor 24 to display the video information on CRT 2. Microprocessor 20 is set to a navigation mode in response to operation of navigation key 4 to visually indicate the position of the vehicle on the displayed map, and during this node, the CPU 20 utilizes the signals from sensors 16 and 17 to indicate the vehicle position.

Landmark key 5 is used to initiate a command to intensify the brightness of one of the displayed nodes as a landmark for assisting the vehicle driver to follow the right path. Mark update key 6 is used to initiate a command for relocating the point of landmark to the next adjacent node. Set key 7 is used when necessary input data has been entered. Digit clear key 8 is operated to clear a last digit number to allow users to correct or update it.

Page keys 9 and 10 are used to enter unit and tenth digit numbers indicative of the page number to the microcomputer as the unit and tenth digit numbers of the desired page. Quadrant keys 11 to 14 are operated when the desired page is to be divided into four parts of quadrant and a desired quadrant is scaled up to the page size and displayed. Successive operations of the quadrant keys enable the desired quadrant to be further divided into four parts of "subquadrant" and a desired one of the subquadrants is scaled up to the page size.

Figure 2:
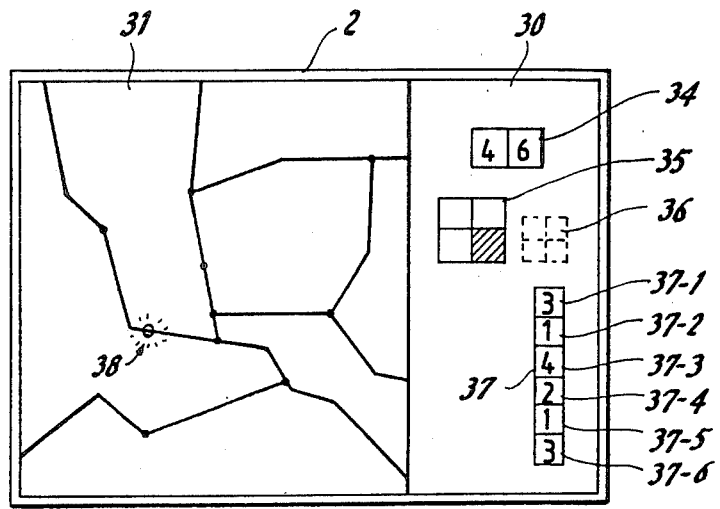
FIG. 2 is an illustration of a display screen.
Figure 3:
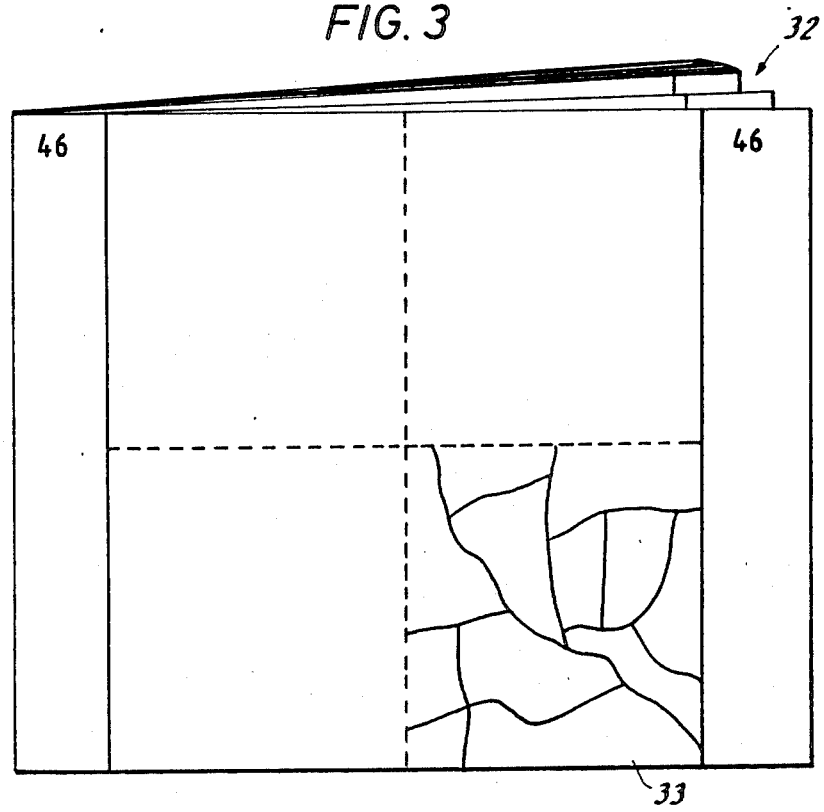
FIG. 3 is an illustration of a road map.

FIG. 2 is an illustration of the screen of the CRT display 2. The display screen is divided into a data area 30 and a map area 31 in which the cathode-ray beam produces a trace of routes and nodes on any of the full or divided sections of page 46 of a map book 32, FIG. 3. When the apparatus is in navigation modes, the position of the vehicle is indicated by a brightly spot on the map, as shown at 38. For purposes of illustration, the lower-right quadrant 33 of page 46 is displayed. The data area 30 has a page indicator 34 which indicates the unit and tenth digits of the page being displayed, a quadrant indicator 35 and a subquadrant indicator 36. The quadrant indicator 35 is a square indicating a whole page which is divided into quadrants. In the illustrated example, the lower-right quadrant of the indicator 35 is hatched to indicate the portion where the cathode-ray beam is intensified to indicate the location of the displayed quadrant 33 within the page. The subquadrant indicator 36 appears on the screen when the information being displayed is a subquadrant and is likewise divided into four quarters corresponding respectively to subquarters of the map page. In the illustrated example, the subquadrant indicator 36 is extinguished. A bar-like indicator 37 is also provided on the data area 30. Indicator 37 is divided into six digit sections 37-1 to 37-6 which give the numerals of the quadrant keys 11-14 which are operated in succession when a desired landmark node is to be visually accessed on the display screen in a manner as will be described later to give an address code identifying the location of the accessed node.

Figure 4:
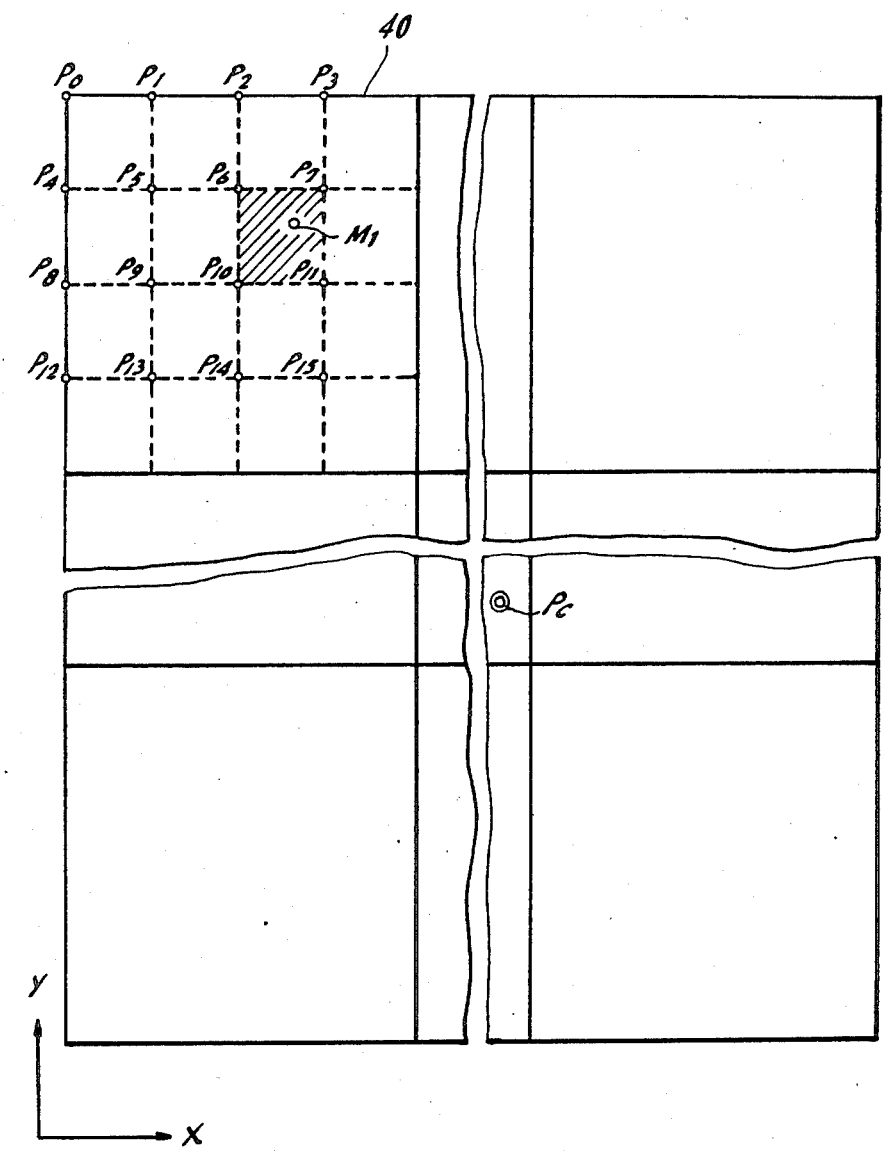
FIG. 4 is an illustration of details of the road map in developed form.

As shown in FIG. 4, each page, shown at 40, is divided into sixteen subquadrants each having a reference point at the upper left corner. These reference points are given by coordinates of X and Y axes with respect to point $P_0$ and the latter is given with reference to an absolute point Pc which may be the capital of the country. The location of every node within the page is given with reference to point $P_0$. Therefore, the positional data stored in the ROM package 15 are given with reference to point $P_0$ by "memory" coordinates. For a full page display, the X-Y coordinate system is given with reference to point $P_0$. However, for displaying a lower-right quadrant, for example, the "memory" coordinate system of this quadrant must be converted to a "display" coordinate system in which point $P_{10}$ is taken as a reference. Likewise, the "memory" coordinate system of a hatched subquadrant must be converted to a display coordinate system in which point $P_6$ is taken as a reference. More specifically, if the hatched quadrant is displayed with a scaled-up ratio of 16, the location of a point M1 $(X_1, Y_1)$ in the displayed subquadrant is given by display coordinates $\{4(X-X_6), 4(Y-Y_6)\}$, where $X_6$ and $Y_6$ indicate the location of reference point $P_6$.

The map is thus displayed in different modes. These display modes are identified by corresponding display levels 0, 1 and 2. Display level 0 indicates a display mode in which a whole page is displayed, display level 1 indicates a mode in which a desired one of the quadrants is displayed, and level 2 indicates a mode in which a desired one of the subquadrants is displayed. Thus, a higher level shows less area on the screen. For each of the different display levels, there are a predetermined number of routes and nodes of different levels of significance labelled 0 (first), 1 (second) and 2 (third). In a typical example, there are a total of 128 nodes within a given page which are displayed on level-2 display modes. Thirty-two nodes of the total 128 nodes are displayed on level-1 display modes and eight of the thirty-two nodes are displayed on level-0 display modes. The 8 nodes which are displayed on either of level-0, level-1 and level-2 display modes are assigned a "node" level 0 indicating the higher level of significance, the 24 $(=32-8)$ nodes which are displayed on either of level-0 and level-1 display modes are assigned a "node" level 1 indicating the medium level of significance, and the 96 $(=128-32)$ nodes which are displayed only during level-2 display modes are assigned a "node" level 2 indicating the lower level of significance. Thus, on the average eight nodes are displayed on each display mode. Comparison is made between the display level and the node level of the given node to display that node if its node level is equal to or smaller than the display level.

In like manner, all the routes are given different "route" levels of significance labelled 0 (first), 1 (second) and 2 (third) corresponding to the node levels 0, 1, 2, respectively. The route levels are compared with the display level to decide whether a given route, together with the nodes on it, is to be displayed. Successively increasing details are therefore made to appear on the display screen as the degree of division increases.

Because of the hierarchical data structure by which the roadway information is stored in ROM package 15, the memory capacity of this package is not required to be as great as the amount which would otherwise be needed to store all the X-Y coordinate addresses of every detail of a map page.

Figure 5:
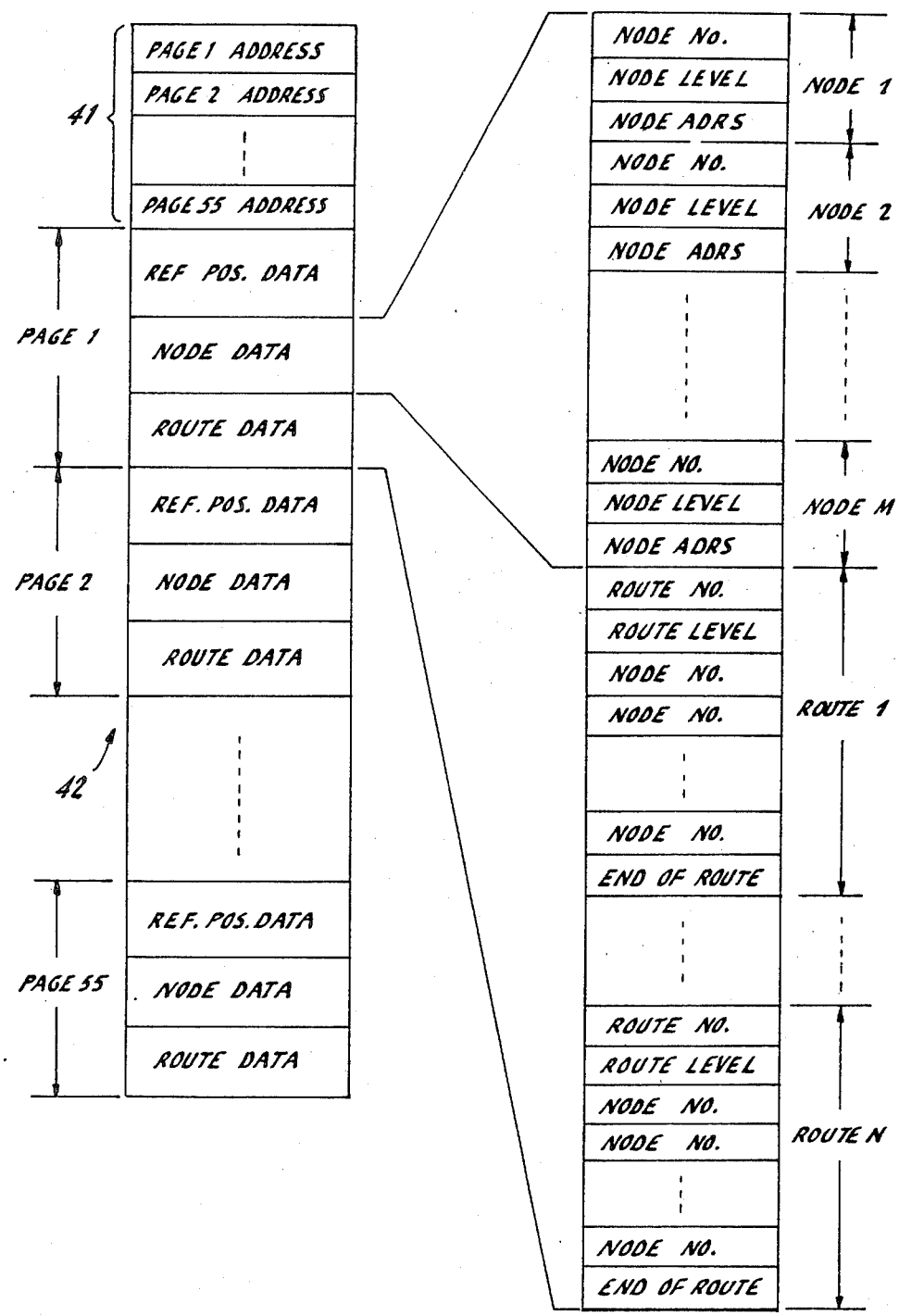
FIG. 5 is an illustration of a data structure according to which road map data is stored in a memory.

One example of the hierarchical data structure is shown in FIG. 5. The data stored in ROM package 15 comprise a page address section 41 and a page data section 42. Page address section 41 contains address data for pages 1 through 55, and the page data section 42 contains a set of data for reference-positions, nodes and routes for pages 1 through 55. The reference position contains data contains X-Y memory address data of reference positions $P_0$ through $P_{15}$. The node data of each page is stored in sections divided according to nodes. Each node data section contains a node number of the node, a node level of the node and a memory address of the node as given by X-Y coordinates. The route data of each page is likewise srored in sections divided according to routes. Each route data section contains a route number of the route, a route level of the route, node numbers of a series of nodes located along the route and an end-of-route code.

Figure 6B:
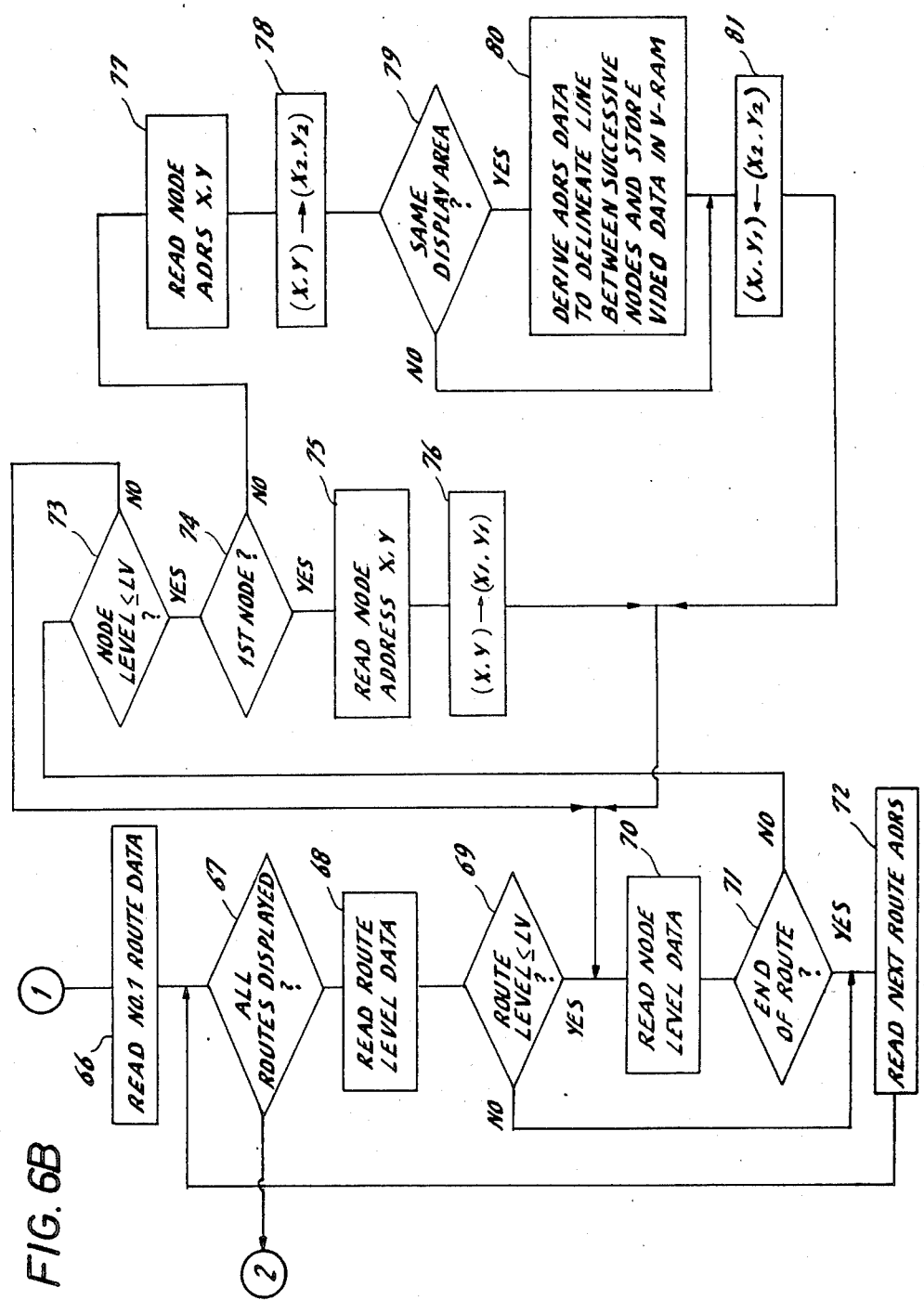
Figure 7:
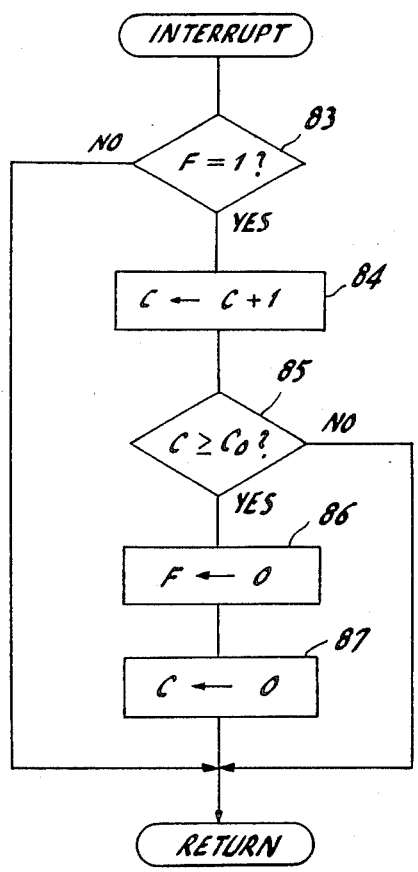
FIG. 7 is a flow diagram of a timer operation associated with FIGS. 6A, 6B.

The operation of microcomputer 1 during map select modes will be described with reference to FIGS. 6A and 6B. A map select mode begins with the operation of map select key 3 which triggers a series of events which include executions in blocks 50 to 53. In block 50, timer flag F is initialized to 1 and display level flag LV is initialized to 0 indicating 0-display level; operation of navigation key 4 is tested in block 51 and end of a preset time interval is tested in block 52. The vehicle occupant may wish to consult with the map book 32 to find a desired page and operates the page keys 9 to place the unit and tenth digits of the desired page number. With the operation of unit-digit key 9, control exits to block 54 to add 1 to the unit digit on indicator 34 and in response to operation of tenth-digit key 10, a 10 is added to the tenth digit of indicator 34 (block 55). The unit- and tenth-digit keys are repeatedly operated until a desired number appears on indicator 34 (block 56). A counter C used for measuring the preset time is reset in block 57. The timing operation, which will be described with reference to FIG. 7, occurs on an interrupt command issued from the timer 26 at periodic intervals. After execution of block 57, control returns to block 51 to repeat the above process.

Operation of one of the quadrant keys 11 to 14 will cause control to pass through blocks 58 and 59 to block 60, but non-operation of such keys will allow control to pass through blocks 58 and 59 to block 62 to test if the set key 7 has been operated.

If level-0 display mode is desired, the occupant depresses the set key 7 immediately after entry of the page numbers, causing control to exit from block 62 to block 66.

If display mode at level 1 is desired, the occupant operates one of the quadrant keys 11-14, followed by the operation of set key 7. Display level flag LV will then be set to 1 in block 60 and the quadrant indicator 35 updated in block 61. After executing block 57, control returns to block 51 and passes through blocks 52, 53 to block 58 to test if the level flag LV is equal to zero. Since this flag has been changed to 1 in block 60 immediately after the operation of the desired quadrant key, control is routed to block 63 to exit to block 62, thence to block 66.

If level-2 display mode is desired, one of the quadrant keys is operated in succession to the initial operation, followed by the operation of set key 7. After the initial operation of the quadrant key, control exits through a "No" decision route from block 62 and returns to block 51 and thence through blocks 52, 53, 58 to block 63 to test if one of the quadrant keys is operated and control exits to block 64 to change the display level flag LV to 2 and goes on to update the subquadrant indicator 36 (block 65). Block 62 will then be executed after control executes a string of blocks 57, 51-53, 58 and 63 to permit control to advance to block 66.

In block 66 the address of the route No. 1 is read from the ROM package 15. Control proceeds through a check step in block 67 to an execution step (block 68) to read the route level information from the data just read out of the memory package and goes to block 69 to test whether the route level is equal to or smaller than the display level given by the level flag LV. If the display level is 0 and the route level is 1 or 2, control exits through "No" decision path to block 72 to increment the route address information and read the route data from the incremented address location, thus discarding that route. If the display level is 1 and the route level is 0 or 1, control exits to block 70 to read the node level of node No. 1 on that route by reading its node number contained in the route No. 1 data section and reading the node level of the same node number from the node data section (see FIG. 5). Control proceeds through block 71 to block 73 to check if the node level of node No. 1 is equal to or smaller than the display level, and if so, control proceeds to block 74 to check if it is the first node and if not, control returns to block 70 to read the node level of the next node.

If node No. 1 is being processed, control goes to the next step in block 75 to read the map address of the No. 1 node from the node data section. This map address (X, Y) is converted to a "display" address $(X_1, Y_1)$ in accordance with the display level (block 76). Control returns to block 70 to read the next node level. If "No" decision is taken at block 74, control exits to block 77 to read the map address of the node being processed and proceeds to block 78 to transform the map address (X, Y) to a display address $(X_2, Y_2)$. Control advances to block 79 to test if successive nodes are within the same display area. If so, control proceeds to block 80 to derive a set of address codes that delineate a line between the previous and present display node addresses $(X_1, Y_1)$ and $(X_2, Y_2)$ and stores binary 1's into cell locations of video RAM 25 as a function of the line-delineating address codes. Block 80 is followed by an updating step (block 81) to update the display address of the previous node with the display address of the next node. Block 80 is skipped if the successive nodes are not located within the same display area.

Control now returns to block 70 to read the node level of the next node. Therefore, control repeats executions on blocks 70, 71 and 73 as it encounters nodes of lower level of significance along a route of higher level of significance and repeats executions on blocks 70, 71, 73, 74, 77 to 81 to store node address data into video RAM 25 as long as nodes of higher significant level are encountered. This process is repeated until an end-of-route code is detected in block 71, whereupon control proceeds to block 72 to read the route data of the next route to repeat the above process. When all routes have been displayed, control exits from block 67 to block 51.

Video display processor 24 is now enabled by the microprocessor 20 to scan video RAM 25 in rectangular raster format in a manner well known in the art to provide the map as specified by the page and quadrant keys on display.

If the navigation key is depressed, control goes to navigation subroutine 82 to indicate the position of the vehicle on the display as marked at 38 in FIG. 2 in a manner well known in the art. This navigation subroutine is also initiated when the predetermined interval has elapsed after the operation of the map select key.

Interrupt command is issued from timer 26 at periodic intervals. When this occurs, the map select subroutine is interrupted and control goes to an interrupt routine, FIG. 7, in which it first checks the status of timer flag F (block 83). If F=1, control exits to block 84 to increment counter C by 1 and proceeds to block 85 to check if count C is equal to or greater than Co representing the predetermined interval. If C is equal to or smaller than Co, timer flag F and count C are both reset to 0 (blocks 86, 87), and if not, control exits from block 84 and returns to the map select subroutine.

Figure 8:
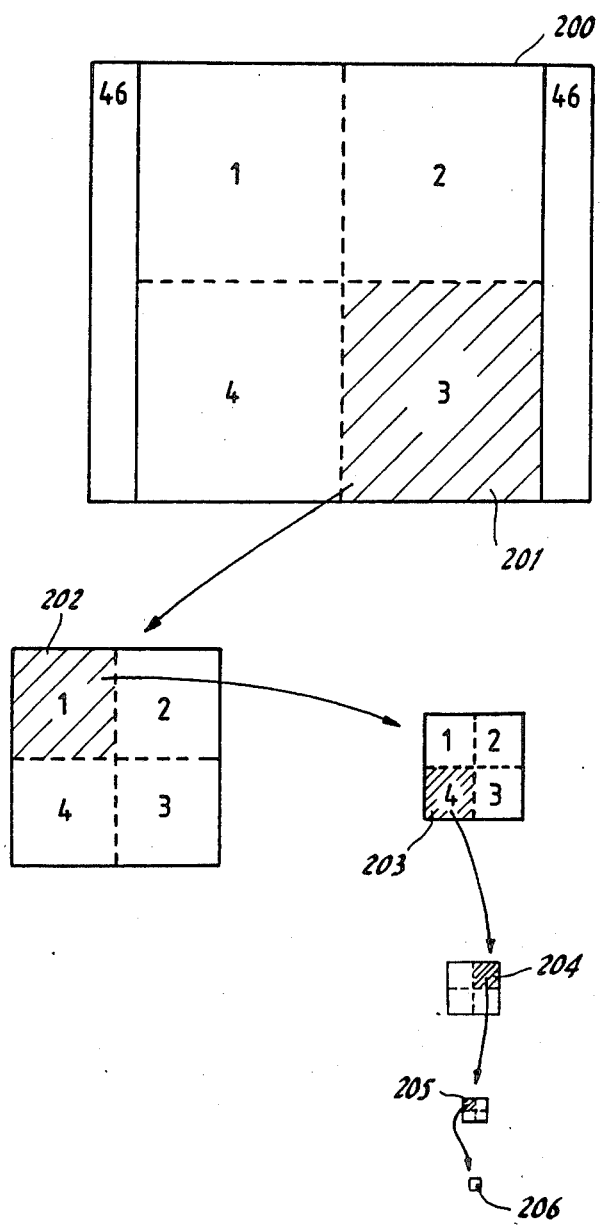
FIG. 8 is a sketch illustrating the method of accessing a desired location of a road map to provide a landmark thereon.

For the convenience of vehicle occupants, it is desirable to intensify a desired node to serve as a landmark on the display. This is done by operating the quadrant keys 11-14 repeatedly until subdivided quadrant diminishes to the size of a desired node and accesses thereto on the display screen. FIG. 8 is a sketch illustrating a sequence of views in which successively divided quadrants are specified by corresponding quadrant keys 11-14 and are indicated by hatchings. First operation of quadrant key 13 designates a quadrant 201 of a map page 200, the quadrant 201 being identified by a first digit number 3. Second operation of quadrant key 11 subdivides the quadrant 201 and specifies a quadrant 202 having a second digit number 1. Third operation of quadrant key 14 causes the quadrant 202 to be subdivided and specifies a quadrant 203 having a third digit number 4. Fourth operation of quadrant key 12 subdivides the quadrant 203 and specifies a quadrant 204 having a fourth digit number 2. Fifth operation of quadrant key 11 divides the quadrant 204 and specifies a quadrant 205 having a fifth digit number 1, and finally sixth operation of quadrant key 13 subdivides the quadrant 205 and specifies a quadrant 206 having a sixth digit number 3. The digit numbers of six-digit code "314213" are displayed on respective digit areas 37-1 to 37-6 of numeral indicator 37.

Figure 9:
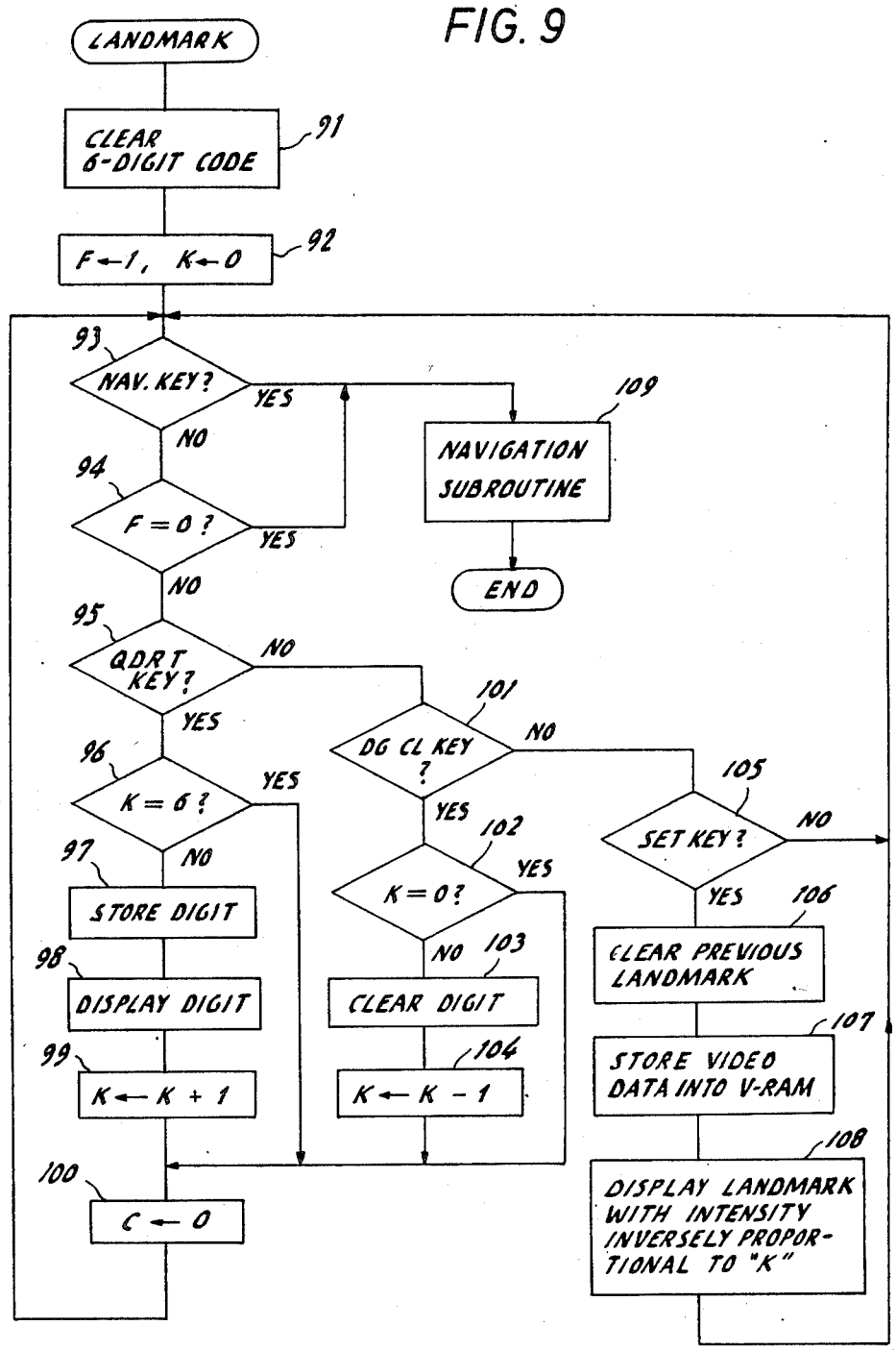
FIG. 9 is a flow diagram of a landmark display routine.

FIG. 9 shows a landmark subroutine which is initiated in response to operation of the landmark key 5. After clearing the six-digit code which has been indicated on indicator 37 (block 91), control is passed to initialization step in block 92 to set the timer flag F and a counter K to 1 and 0, respectively. After passing through navigation check step (block 93) and timer flag check step (block 94), control reaches block 95 to test if one of the quadrant keys 11–14 is operated. If so, control advances to block 96 to see if K is equal to 6. If K is not equal to 6, control goes to block 97 to store a digit number into a specified cell location of the RAM 23. Assume that the six-digit code "314213" is to be entered and the first digit number 3 is entered by the occupant, the first digit number 3 is stored in the specified cell location or the RAM. Control advances to block 98 to display the digit number just stored in RAM 23 on the first digit position 37-1 of indicator 37. Count value K is then incremented by 1 in block 99, followed by resetting of timer count C to 0-(block 100) with control returning to block 93 to repeat the above process. The six-digit code "314213" is thus stored in RAM 23 and displayed on indicator 37, with the count value K being equal to 6. Control exits from block 95 to block 101 and, if digit clear key 8 is not operated, goes to block 105 to check if the set key is operated. After the entered six-digit code is ascertained, tne vehicle driver operates the set key 7. The microprocessor detects this condition and proceeds to block 106 to clear the previously displayed landmark and goes to block 107 to register the six-digit code stored in RAM 23 into video RAM 25. The registered code is then used in block 108 to direct the cathode-ray beam to a point specified by the six-digit code with an intensity inversely as a function of the value K. Therefore, the displayed spot is indicated with an intensity proportional to the size of the desired landmark.

After execution of block 108, control returns to block 93. In response to operation of navigation key 4 control exits from block 93 to execute navigation subroutine 109.

The digit clear key 8 is used to correct the 6-digit code when it is being entered. When digit clear key 8 is operated, control is passed through block 102 to block 103 to clear the digit number displayed on indicator 37 at the last moment and goes to block 104 to decrement the K value by 1.

The procedures involved in the landmark indication mode can be simplified by an embodiment shown in FIGS. 10 to 15. In this embodiment, the node data are stored in a format different from the format of FIG. 5 to facilitate to load the node data into separately accessible files according to their node levels.

Figures 10A, 10B, 10C:
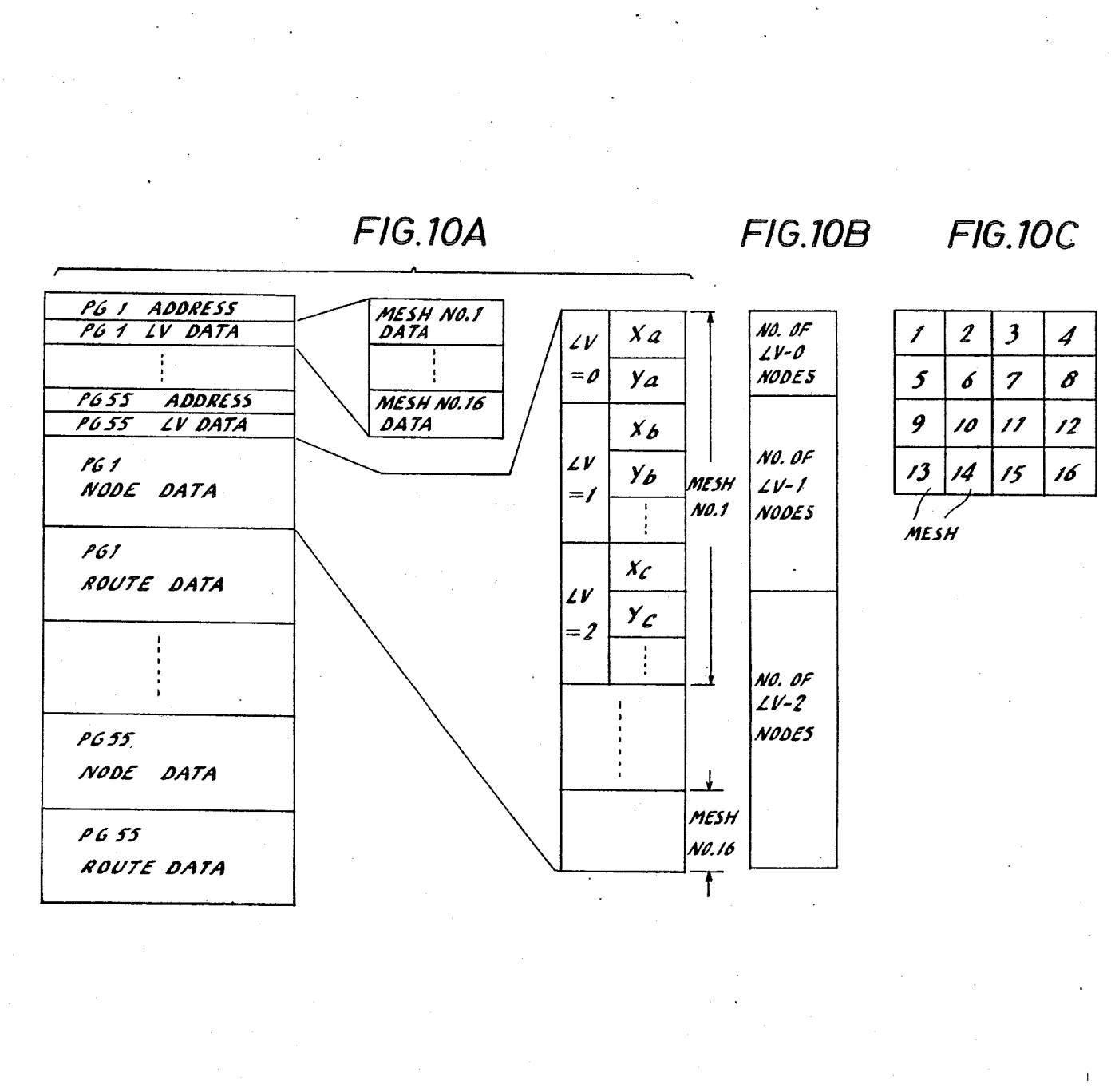

FIGS. 10A and 10B are illustrations of the data format of this embodiment. In this data format, the node level data of each page are grouped according to No. 1 to No. 16 subquadrants or "meshes" which are arranged as shown in FIG. 10C. As shown in FIG. 10B, each mesh data contains information on the number of level-0 nodes, level-1 nodes and 2-level nodes. In this embodiment only level-0 or level-1 nodes are used as landmark and indicated only during level-0 or level-1 display modes. The node data of each page is grouped into meshes No. 1 to No. 16 and in each mesh nodes data are grouped according to their node levels. For example, level-0 nodes are stored in locations Xa, Ya, level-1 nodes in locations Xb, Yb, and level-2 nodes in locations Xc, Yc.

Figure 11:
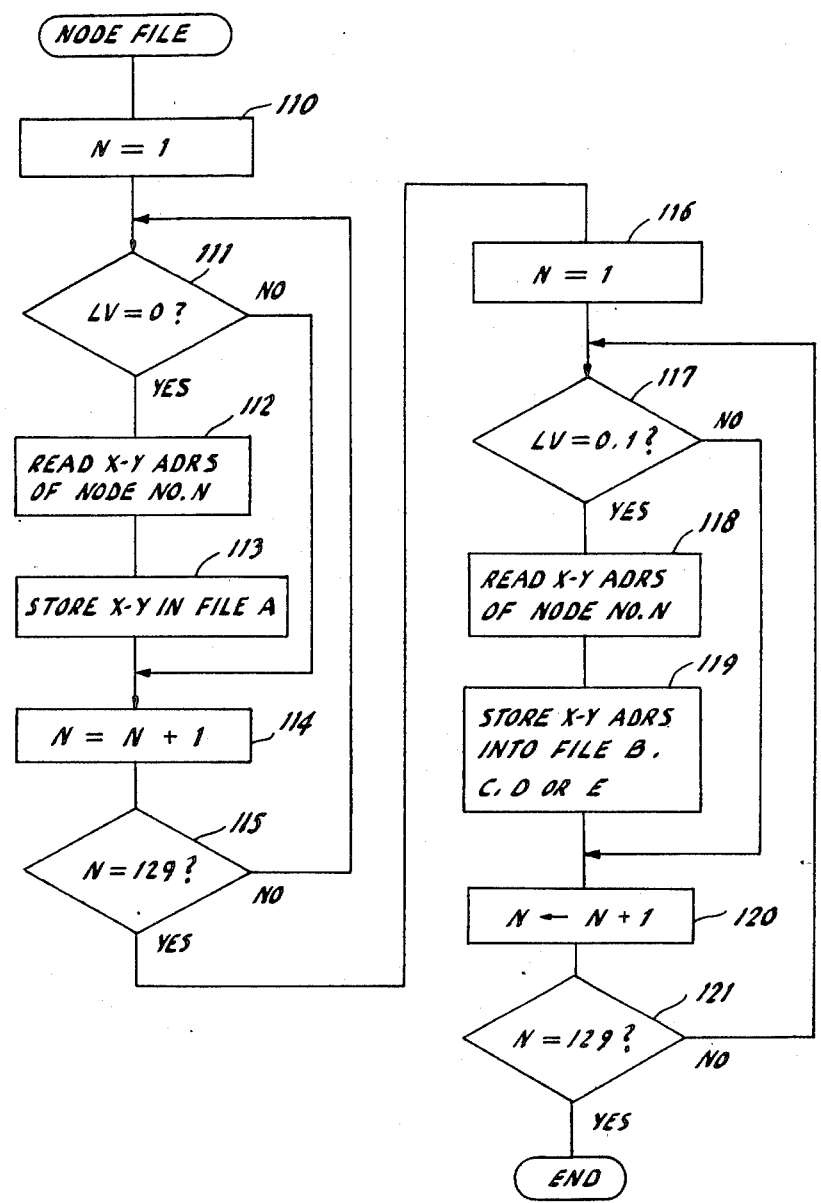
FIG. 11 is a flow diagram for providing a node file routine.

FIG. 11 shows a node file subroutine in which the node data are loaded into separate files A, B, C, D, E and F according to their node levels and meshes to which they belong. The node file subroutine begins with operation of the landmark key 5. Initially, node number, counter N is set to 1 (block 110). A check step (block 111) follows to test if display level represented by flag LV equals 0 or not. If the display level is not 0, control advances to block 114 to increment the node number N by i and if the display level is level 0, control exits to block 112 to read the X-Y address data of the 0-level node of node number N and goes to block 113 to file the X-Y address data into a specified cell of "file" area A of RAM 23. After the node number N is incremented in block 114, control goes to block 115 to check if N = 129 which equals the total number of nodes present in the displayed page plus 1. If N is not reached, control returns to block 111 to repeat the process so that all the 0-level nodes of a desired page are stored in the specified cell locations of the file area A as shown in FIG. 12A. The stored address data are retrieved in the same order as they are filed. In the file A, eight level-0 nodes are given 1 to 8 order numbers according to which they are retrieved from file A. Control now advances to block 116 to set the node number counter N to 1 again and goes to block 117 to check if the display level is 0 or 1. If the display level is 2, control exits to block 120 to increment the counter by 1 and if the display level is either 0 or 1, control proceeds to block 118 to read the address data of level-0 and level-1 nodes of node number N. This address data is sequentially loaded into files B, C, D and, E (block 119). This filing operation is carried out in accordance with the position of the quadrant to whicn the node belongs so that the node address data of level-1 and level-0 nodes of Nos. 1, 2, 5 and 6 meshes (which are located in quadrant 1) are stored in file B such that it contains six level-1 node addresses and two level-0 node addresses, for example.

The address data of level-1 and level-0 nodes of Nos. 3, 4, 7 and 8 meshes are stored in file C so that it contains six level-1 node addresses and two level-0 node addresses, for example. Likewise, node address data of level-1 and level-0 nodes of Nos. 9, 10, 13 and 14 and those in Nos. 11, 12, 15 and 16 are stored in files D and E, respectively, (see FIG. 12B). An additional landmark can be stored in a file F by specifying a desired node using the quadrant keys 11–14 in a manner identical to the entry of the 6-digit code as described in connection with the previous embodiment. The user's specified node address $X_F$, $Y_F$ (FIG. 12C) is given an order No. 9 to be displayed subsequent to the display of the highest precedence number node of each of the files A to E.

Blocks 117 to 121 are repeated until N=129 is detected in block 121.

Figure 13A:
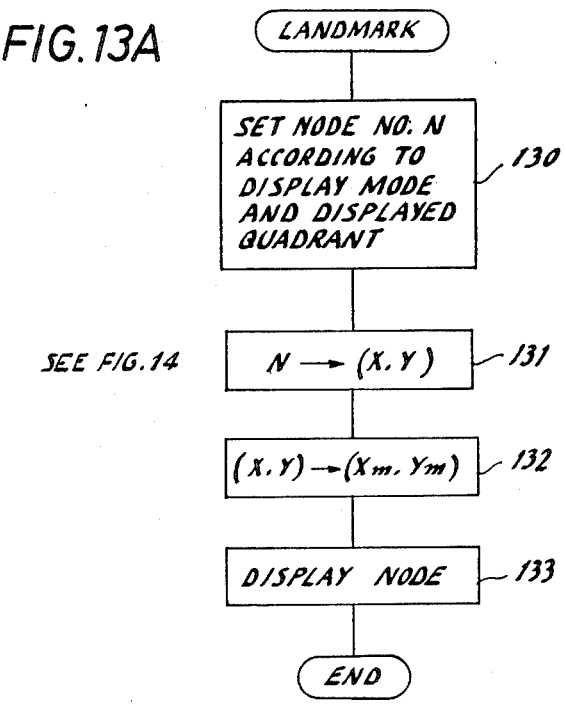
FIGS. 13A and 13B are flow diagrams of another landmark display subroutine.

With all the node addresses of a given page being stored in respective files, a landmark subroutine shown at FIG. 13A begins with an initializing step in block 130. In this step, node number N is set to an initial number according to the display level LV and the position of the displayed quadrant. Control goes to block 131 to read the X-Y address data of the number N node.

Figure 14:
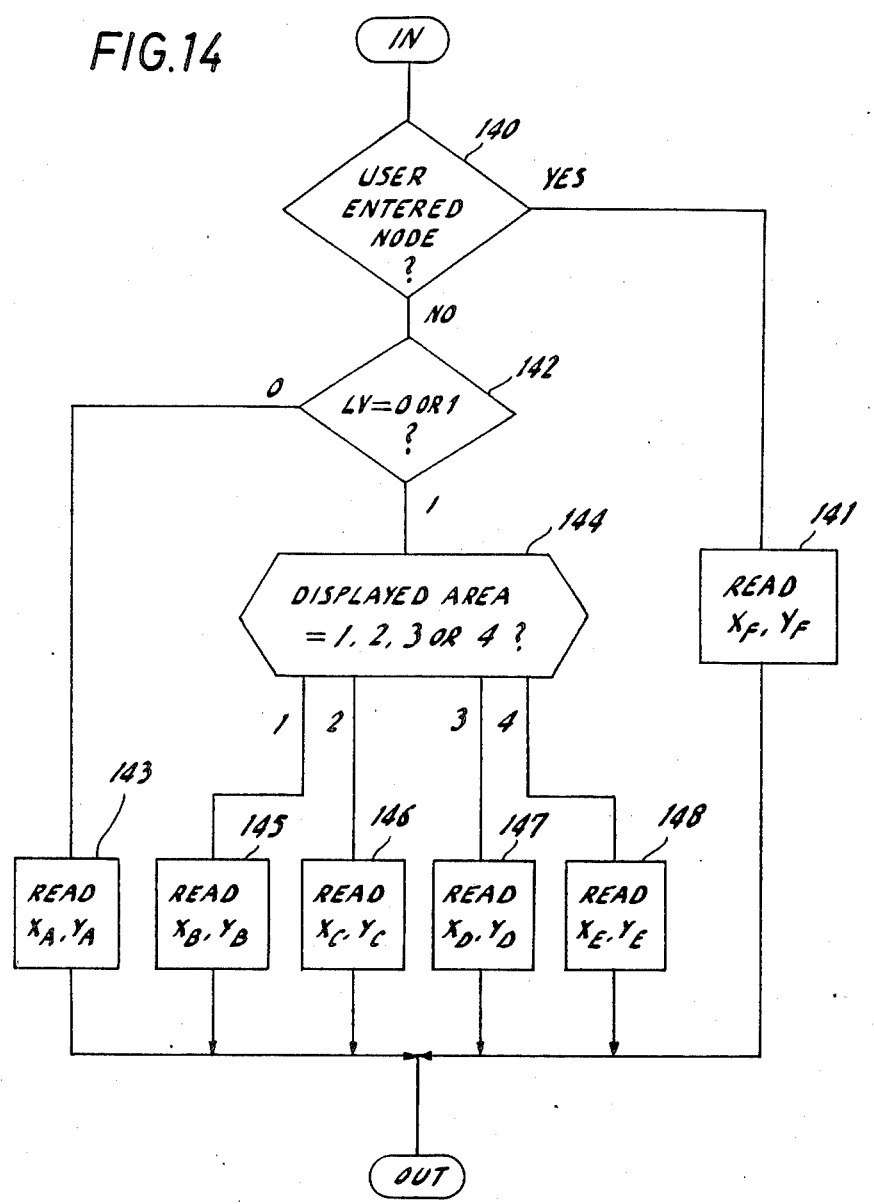
FIGS. 14 and 15 are flow diagrams associated with FIGS. 13A and 13B.

FIG. 14 shows the details of block 131. In block 140 the microprocessor checks to determine if the number-N node corresponds to the user-entered node having the address $X_F$, $Y_F$, and if so, it proceeds to block 141 to read the data $X_F$, $Y_F$ from file F. If otherwise, control goes to block 142 to test if the display level is 0 or 1. If display mode is 0, control advances to block 143 to read an address code $X_A$, $Y_A$ of the initialized node number N from file A, and if the display mode is 1, control exits to block 144 to determine which one of quadrants 1, 2, 3 and 4 is being displayed. Block 145, 146, 147 or 148 is executed if the displayed quadrant is 1, 2, 3 or 4, respectively, to read one of address codes $(X_B, Y_B)$, $(X_C, Y_C)$, $(X_D, Y_D)$ and $(X_E, Y_E)$ determined by the initialized node number N from files B, C, D and E. If display level is 1 and quadrant 2 is displayed, the node number will be initially set to C1 in block 130 and the address data $X_{C1}$, $Y_{C1}$ are derived in block 131.

Since the X-Y address obtained at block 131 is a memory address, it is converted to a display address (Xm, Ym) in block 132. A landmark node is displayed at location Xm, Ym (block 133). If this landmark node is to be changed, the vehicle driver will operate rhe update key 6.

Figure 13B:
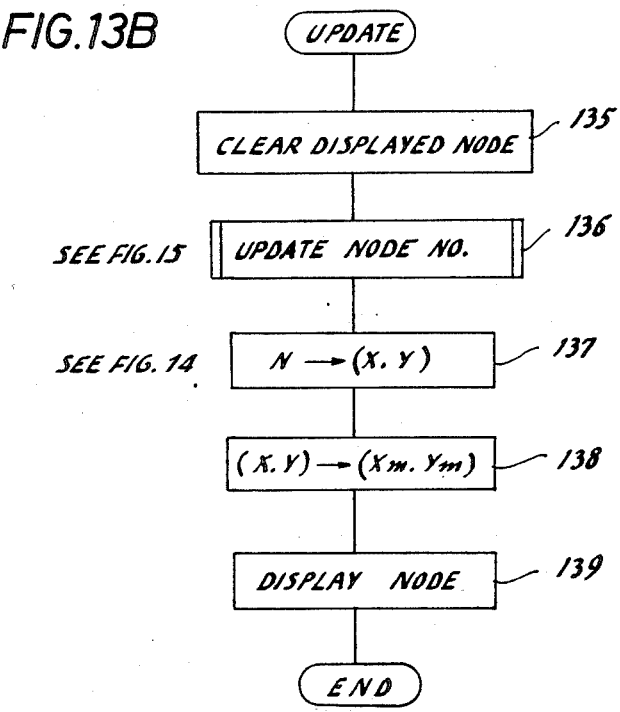
Figure 15:
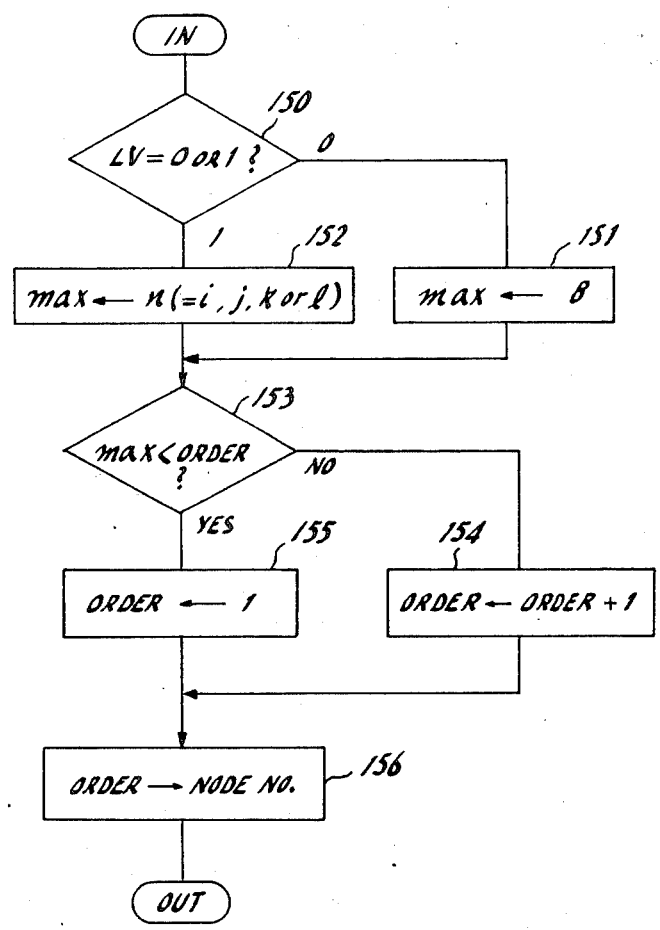

Operation of update key 8 causes an updata subroutine shown at FIG. 13B to begin with a display clear execution step in block 135 to clear the displayed node. Control goes to block 136 to update the cleared landmark with a new landmark node. Details of block 136 are shown in FIG. 15. In block 150, display level is checked against 0 and 1 to take a path to block 151 if display mode is 0 or take a path to block 152 if the display mode is 1. Maximum count value, which indicates the total number of level-0 or level-1 node codes contained in each of the files A to E, is set to 8 if the display mode is 0 or set to n which equals i, j, k or l of the files B to E, respectively. The maximum count value is compared in block 153 with tne order precedence number of the cleared node, and if the latter is smaller than the maximum value, control goes to block 154 to increment the precedence number by 1 and if the latter is greater than the maximum value control goes to block 155 to reset the precedence number to 1. The incremented order number is converted to a corresponding node number N (block 156).

From the node number N thus obtained in block 136 is derived a corresponding X-Y address code in block 137 in a manner identical to block 131 using the subroutine of FIG. 13. This address code is converred to display address code Xm, Ym in block 138 to display a new landmark node at the updated address Xm, Ym (block 139). Therefore, operation of the update key allows the next landmark to appear instantly in a prescribed order of precedence. When the filed landmark nodes shown at FIGS. 12A and 12B are all displayed in sequence, the user-entered landmark node (FIG. 12C) appears in either display mode before the order of precedence is reset to 1 in block 153.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A navigational apparatus for displaying a road map which has a plurality of pages, comprising:
   command entry means having a plurality of keys associated respectively with equally divided sections of a specified one of the plurality of pages of the road map, said command entry means for specifying a desired page of the map;
   memory means for storing road map data which corresponds to the road map to be displayed;
   display means; and
   processing means responsive to said command entry means, for: (1) providing information to said display means to provide a display of a page number indication of said specified one page of the road map, (2) addressing said memory means according to said specified one page to read stored data from said memory means corresponding to said one page, (3) passing said stored data to said display means to display said road map, (4) generating, responsive to each of successive operations of said keys of said command entry means, a digit of a multidigit code indicating a location of a desired landmark on said display means, the number of said digits in said multidigit code indicating a size of said landmark, and (5) displaying said landmark on said display means with an intensity which is an inverse function of the number of said digits.

2. A navigational apparatus as claimed in claim 1, wherein said processing means is also for providing said multidigit code to said display means to thereby display said multidigit code.

3. A navigational apparatus as claimed in claim 1, wherein said equally divided sections of said specified one page are quadrants and said keys are arranged to correspond to said quadrants rspectively.

4. A navigational apparatus for displaying a road map, which has a plurality of pages comprising:
   manually operated command entry means including a command entry key, for specifying a desired page of the road map;
   memory means for storing road map data which corresponds to the road map to be displayed;
   displaying means;
   processing means, responsive to said command and entry means, for: (1) providing information to said display means to provide a display of a page number indication of said desired page of the road map, (2) addressing said memory means according to said desired page to read stored data from said memory means corresponding to said desired page, and (3) passing the stored data to said display means to display said road map; and
   second memory means for storing predetermined node data, wherein said processing means is also for addressing a first predetermined data stored in said second memory means, converting a storage location of said first predetermined data to a first coordinate address indicative of a first location on said display means, intensifying a display illuminated of a first landmark on said display means at said first location, addressing a second predetermined data stored in said second memory means in response to operation of said command key, converting a storage location of said second data to a second coordinate address indicative of a second location in said second memory means, and intensifying a display illumination of a second landmark of said display means at said second location while removing display of said first landmark at said first location.

5. A navigational apparatus for displaying a road map including a plurality of pages on a display means, comprising:

command entry means for specifying a desired page of the map and specifying a specified scale as one of first and second display scales;

memory means for storing road map data representing a plurality of nodes along a plurality of routes on each of said pages, said data comprising first node data having a first level of significance and second node data having a second level of significance, said first and second node data being addressable according to said display scales specified by said command entry means; and processing means for reading stored data from said memory means according to the desired page and the specified scale so that the first node data is read when said first scale is specified and the first and second node data are read when the second scale is specified and for converting the storage location of the read data to a coordinate address indicative of a location of said memory means, to cause said display means to provide display of said road map.

6. A navigational apparatus as claimed in claim 5, wherein said command entry means comprises a plurality of digit entry keys associated respectively with equally divided sections of the page, and wherein said processing means is effective to generate a digit in response to each successive operation of said digit entry keys to generate a multidigit code indicating the location of a desired landmark on said display means, the number of said digits indicating the size of said landmark, said processing means being effective to display the landmark on said display means with an intensity which is an inverse function of the number of said digits.

7. A navigational apparatus as claimed in claim 5, wherein said command entry means comprises a key, and wherein said processing means is also for reading a first predetermined data representative of said first node data and converting a storage location of the first predetermined data to a first storage location of said memory means at a coordinate address indicative of a first location of said display means, to display a first landmark on said display means at said first location, and is also for reading a second predetermined data representative of said first node data in response to an operation of said key, converting a storage location of the second predetermined data to a second storage location of said memory means at a coordinate address indicative of a second location of said display means and causing the display means to provide a display of a second landmark in the second locationC while removing display of the said first landmark at said first location.

8. A navigational apparatus for displaying a road map including a plurality of pages on display means, comprising:

command entry means for specifying a first display mode indicating that a whole area of a desired page of said map is to be displayed and a second display mode indicating that a desired one of equally divided adjoining sections of said desired page is to be displayed;

memory means for storing data representing a plurality of nodes along a plurality of routes for each of said pages, the node representing data of each page comprising first and second node data indicating whether the node is of a first or second level of significance; and data processing means for addressing said memory means according to the specified display mode for reading the first node data when said first display mode is specified or reading both the first nd second node data when said second display mode is specified, converting storage locations of the data read out of said memory means to first coordinate addresses representing first locations on said display means, and deriving second coordinate addresses that indicate locations which delineate a line between successive ones of the first coordinate addresses to cause said display means to provide display of said road map.

9. A navigational apparatus as claimed in claim 8, wherein said data processing means generates a page number indication of said desired page and causes said display means to provide display of said page number indication.

10. A navigational apparatus as claimed in claim 9, wherein said data processing means generates an area indication of the desired section and causes said display means to provide display of said area indication.

11. A navigational apparatus as claimed in claim 8, wherein said first and second node data are stored in differently accessable groups according to said routes, said groups being identified respectively by first and second levels of significance corresponding to said first and second levels of node data respectively, wherein said data processing means is effective to read the first node data of the groups of the first significant level when either of the first and second display modes is specified or some of the first and second node data of the first and second significant levels which represents the nodes within said desired section when said second display mode is specified.

12. A navigational apparatus as claimed in claim 8, wherein said equally divided sections are quadrants of said page.

13. A navigational apparatus as claimed in claim 8, further comprising second memory means and video processing means, wherein said data processing means is effective to store video information into said second memory means according to the second coordinare addresses to enable said video processing means to scan said second memory means in raster format and read the stored video information out of the second memory means into said display means.

14. A navigational apparatus a claimed in claim 8, wherein said command entry means comprises a plurality of keys associated respectively with equally divided sections of the page, and wherein said dara processing means is effective to generate a digit in response to each successive operation of said keys to generate a multidigit code indicating the location of a desired landmark on said display means, the number of said digits indicating the size of said landmark, said processing means being effective to display the landmark on said display means with an intensity which is an inverse function of the number of said digits.

15. A navigational apparatus as claimed in claim 8, wherein said command entry means comprises an update command key, and wherein said data processing means is also for reading a first predetermined data from said first node data and converting the storage location of the first predetermined data to a first storage location of said memory means at a coordinate address indicative of a first location of said display means to display a first landmark on said display means in said first location, and is also for reading a second predetermined data of said first node data in response to an operation of said update command key and converting a storage location of the second predetermined data to a second storage location of said memory means at a coordinate address indicative of a second location of said display means and causing said display means to provide display of a second landmark in the second location while removing display of said first landmark at said first location.

16. A navigational apparatus as claimed in claim 15, wherein said command entry means comprises a plurality of digit entry keys associated respectively with equally divided sections of the page, and wherein said data processing means generates a digit in response to each successive operation of said digit entry keys to generate a multidigit code indicating a memory location of a desired node among said first node data, converts, in response to operation of said update command key, the memory location of said desired node to a third coordinate address indicating a third location on said display means and causes said display means to provide a display of a third landmark in said third location while removing display of said second landmark.

17. A navigational apparatus as claimed in claim 8, wherein said command entry means further includes means for specifying a third display mode indicating that a desired one of equally divided adjoining subsections of each one of said sections is to be displayed;
wherein said node representing data of each page further includes third node data representing nodes of a third level of significance; and
wherein said data processing means is also for addressing said memory means according to the specified display mode for reading the first, second and third node data when said third display mode is specified.

18. A navigational apparatus as claimed in claim 17, wherein said data processing means generates a page number indication of said desired page and causes said display means to provide display of said page number indication.

19. An apparatus as claimed in claim 17, wherein said data processing mean generates first and second area indications of the locations of the desired section and the desired subsection respectively when said third display mode is specified and causes said display means to provide display of said first and second area indications.

20. An apparatus as claimed in claim 17,
wherein said first, second and third node data are stored in a plurality of differently accessable groups according to said routes, said groups being identified respectively by first, second and third levels of significance corresponding to the first, second, and third significant levels of said first, second and third node data respectively, and
wherein said processing means reads the node data of the group of the first significant level when either of the first, second or third display modes is specified or reads the node data of the groups of the first and second significant levels when either of said first and said second display modes is specified, or reads the node data of the groups of the first, second and third significant levels when said third display mode is specified.

21. An apparatus as claimed in claim 16, wherein said processing means causes said display means to provide display of said multidigit code.

22. An apparatus as claimed in claim 17,
wherein said command entry means comprises a plurality of digit entry keys associated respectively with equally divided sections of the page, and
wherein said data processing means generates a digit in response to each successive operation of said digit entry keys to generate a multidigit code indicating the location of a desired landmark on said display means, the number of said digits indicating the size of said landmark, said processing means being effective to cause said display means to provide display of the landmark with an intensity which is an inverse function of the number of said digits.

23. A navigational apparatus as claimed in claim 22, wherein said sections are quadrants of said page and said digit entry keys are arranged to correspond to said quadrants respectively.

24. An apparatus as claimed in claim 17,
wherein said command entry means comprises an update command key, and
wherein said data processing means reads a first predetermined data from among said first node data when said first display mode is specified or from among said first and second node data when said second display mode is specified, converts the storage location of the first or second predetermined data to a first coordinate address indicative of a location of said memory means to cause said display means to provide display of a first landmark in said first location, and reads in response to operation of said update command key a second predetermined data from said first ndde data when said first display mode is specified or from said first and second node data when said second display mode is specified and converts the storage location of the second predetermined data to a second coordinate address indicative of a location of said memory means to cause said display means to provide display of a second landmark in the second location while removing display of said first landmark.

25. An apparatus as claimed in claim 24,
wherein said command entry means comprises a plurality of digit entry keys associated respectively with equally divided sections of the page, and
wherein said data processing means generates a digit in response to each successive operation of said digit entry keys to generate a multidigit code indicating a memory location of a desired node data among said first node data, and is responsive to an operation of said update command key to convert the memory location of said desired node datum to a third coordinate address indicative of a location of said display means to cause said display means to provide a display of a third landmark in said third location instead of said second landmark.

* * * * *